United States Patent [19]
Saitoh et al.

[11] Patent Number: 5,707,701
[45] Date of Patent: Jan. 13, 1998

[54] RESIN/RUBBER LAMINATE

[75] Inventors: Shinji Saitoh, Kodaira; Setsuo Akiyama, Sagamihara; Kazuo Naito, Kawasaki, all of Japan

[73] Assignee: Bridgestone Corporation, Tokyo, Japan

[21] Appl. No.: 518,296

[22] Filed: Aug. 23, 1995

[30] Foreign Application Priority Data

Aug. 31, 1994 [JP] Japan .................................. 6-230264
Aug. 31, 1994 [JP] Japan .................................. 6-230265

[51] Int. Cl.⁶ .................................................. B29D 23/00
[52] U.S. Cl. ................................... 428/36.91; 428/475.8; 428/476.1; 428/476.3; 428/476.9; 138/137
[58] Field of Search ...................... 428/475.8, 476.1, 428/476.3, 476.9, 451, 36.8, 36.9, 36.91; 138/118, 137, 140, 141

[56] References Cited

U.S. PATENT DOCUMENTS 4,372,800  2/1983  Oizumi et al. .................... 156/307.3
4,593,068  6/1986  Hirose et al. ..................... 525/100

Primary Examiner—James J. Seidleck
Assistant Examiner—Michael A. Williamson
Attorney, Agent, or Firm—Sughrue, Mion, Zinn, Macpeak & Seas, PLLC

[57] ABSTRACT

A rubber composition comprising a rubber component and a di- or trialkoxysilane compound is joined to a surface-modified resin to form a resin/rubber laminate. The laminate typically forms a refrigerant carrying hose wherein the resin defines an inside surface.

6 Claims, 2 Drawing Sheets

RESIN/RUBBER LAMINATE

FIELD OF THE INVENTION

This invention relates to a resin/rubber laminate wherein unvulcanized rubber is firmly joined to resin. The laminate is useful in a variety of applications, typically refrigerant carrying hoses for use in automotive and other air conditioners.

BACKGROUND ART

In the prior art, resin/rubber laminates are typically prepared by cleaning a resin surface, applying an optional undercoating adhesive or primer thereto, drying and optionally curing the primer, applying an overcoating adhesive thereto, drying the adhesive, applying unvulcanized rubber thereto by extrusion or injection, and thermally or otherwise vulcanizing the rubber in a mold or the like.

Copolymers of isobutylene and para-methylstyrene wherein the para-methylstyrene is partially brominated have an excellent resistance to water penetration comparable to IIR (isobutylene isoprene rubber) and a superior resistance to thermal softening, heat and compression set as compared with conventional rubbers, but are difficult to join to different materials even when an adhesive is used.

It is thus desired to improve the adhesion between the copolymer of isobutylene and para-methylstyrene wherein the para-methylstyrene is partially brominated and a resin. Especially, for refrigerant carrying hoses, it is desired to improve resistances to water penetration, thermal softening, heat and compression set in addition to the improved adhesion.

SUMMARY OF THE INVENTION

Therefore, an object of the present invention is to provide a resin/rubber laminate in which a resin layer can be firmly joined to a rubber layer even when copolymers of isobutylene and para-methylstyrene wherein the para-methylstyrene is partially brominated are used as the rubber layer.

Another object of the present invention is to provide a refrigerant carrying hose having inner resin and outer rubber layers which is improved in resistance to thermal softening, heat resistance, and resistance to compression set, and which prevents refrigerant leakage by using a copolymer of isobutylene and para-methylstyrene wherein the para-methylstyrene is partially brominated as the outer rubber layer.

The inventors have found that when an unvulcanized rubber composition comprising a rubber component and a specific alkoxysilane is laid on a resin which has been surface modified, typically by plasma treatment, corona discharge treatment or ultraviolet radiation irradiation, and vulcanized, the resin and the rubber can be firmly joined together even when copolymers of isobutylene and para-methylstyrene wherein the para-methylstyrene is partially brominated are used as the rubber layer.

The present invention provides a resin/rubber laminate wherein a layer of a rubber composition comprising a rubber component and an alkoxysilane compound of the general formula (1):

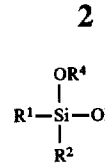

wherein $R^1$ and $R^2$ are functional groups, $R^3$ and $R^4$ are hydrocarbon groups is joined to a surface-modified layer of a resin. In a preferred embodiment, a copolymer of isobutylene and para-methylstyrene wherein the para-methylstyrene is partially brominated is used as the rubber.

One application of the laminate is a refrigerant carrying hose. Regarding a refrigerant carrying hose having inner resin and outer rubber layers, we have found that when the outer rubber layer is formed of a rubber composition comprising a copolymer of isobutylene and para-methylstyrene wherein the para-methylstyrene is partially brominated, which is simply referred to as a brominated IB-PMS copolymer, hereinafter, and an alkoxysilane compound of formula (1), the inner resin and outer rubber layers can be readily and firmly joined together by preventing refrigerant leakage. That is, a refrigerant carrying hose which is improved in resistance to thermal softening, heat resistance, and resistance to compression set and which prevents refrigerant leakage can be provided.

BEST MODE FOR CARRYING OUT THE INVENTION

Figure 1:
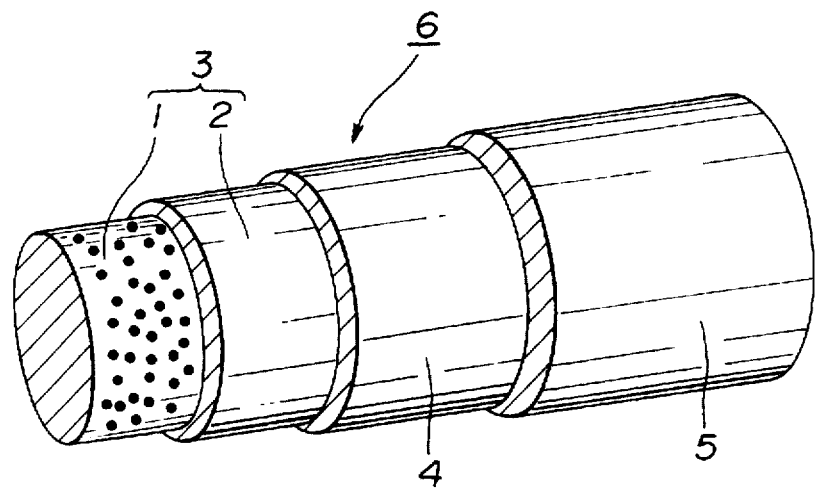
FIG. 1 is a perspective view of a refrigerant carrying hose according to one embodiment of the invention.

According to the present invention, a layer of a rubber composition comprising a rubber component and an alkoxysilane compound of formula (1) is laid on and joined to a surface-modified layer of a resin, yielding a resin/rubber laminate.

A base component of the rubber composition is a rubber component which may be selected from natural rubber, isoprene rubbers, styrene-butadiene copolymer rubbers, acrylonitrile-butadiene copolymer rubbers, butadiene rubbers, chloroprene rubbers, butyl rubbers, ethylene-propylene-diene rubbers, silicone rubbers, fluororubbers, isobutylene-p-methylstyrene copolymer rubbers (IB-PMS), isobutylene-p-methylstyrene copolymer rubbers wherein p-methylstyrene is partially brominated (brominated IB-PMS), and chlorosulfonated polyethylene rubbers. Preferred are acrylonitrile-butadiene copolymer rubbers, brominated IB-PMS, and chlorosulfonated polyethylene rubbers. The brominated IB-PMS copolymer is preferred, especially for refrigerant carrying hoses.

The brominated IB-PMS copolymer is an IB-PMS copolymer in which part of PMS is brominated for crosslinking as disclosed in Japanese Patent Application Kokai (JP-A) No. 150408/1990. The percent bromination is preferably 10 to 80%, especially 20 to 70% of the copolymerized PMS. No effective crosslinking would be expected with a percent bromination of less than 10% whereas heat resistance would be low with a percent bromination of more than 80%.

Isobutylene and para-methylstyrene are copolymerized in such a proportion that the copolymer contains 2 to 20% by weight, especially 5 to 10% by weight of PMS. Copolymers containing more than 20% by weight of PMS would have a higher glass transition temperature (Tg) and lose rubber properties whereas copolymers containing less than 2% by weight of PMS would be low in crosslinking efficiency.

The alkoxysilane compound to be blended has the general formula (1):

wherein $R^1$ and $R^2$ are functional groups, $R^3$ and $R^4$ are hydrocarbon groups. Examples of the functional groups represented by $R^1$ and $R^2$ include alkyl groups such as methyl, ethyl and propyl, alkoxy groups such as methoxy and ethoxy, aminoalkyl groups, mercaptoalkyl groups, halogenated alkyl groups, vinyl groups, vinylalkyl groups, and methacryloxyalkyl groups though not limited thereto. $R^3$ and $R^4$ are hydrocarbon groups, typically alkyl groups such as methyl and ethyl. Then —$OR^3$ and —$OR^4$ are typically alkoxy groups such as methoxy and ethoxy.

The alkoxysilane compound of formula (1) may be a dialkoxysilane, a trialkoxysilane, or a mixture of both. Several illustrative, non-limiting examples of the alkoxysilane compound of formula (1) include tetramethoxysilane, tetraethoxysilane, methyltriethoxysilane, vinyltrimethoxysilane, γ-chloropropyltrimethoxysilane, γ-mercaptopropyltrimethoxysilane, γ-methacryloxypropyltrimethoxysilane, γ-glycidoxypropyltrimethoxysilane, γ-aminopropyltriethoxysilane, γ-aminopropyltrimethoxysilane, γ-(2-aminoethyl)aminopropyltrimethoxysilane, γ-(2-aminoethyl)-aminopropylmethyldimethoxysilane, γ-anilinopropyltrimethoxysilane, γ-ureidopropyltriethoxysilane, and N-β-(N-vinylbenzylaminoethyl)-γ-aminopropyltrimethoxysilane. Preferred among these are those having an amino group in their functional group, for example, γ-aminopropyltriethoxysilane, γ-aminopropyltrimethoxysilane, γ-(2-aminoethyl)-aminopropyltrimethoxysilane, γ-(2-aminoethyl)-aminopropylmethyldimethoxysilane, γ-anilinopropyltrimethoxysilane, γ-ureidopropyltriethoxysilane, and N-β-(N-vinylbenzylaminoethyl)-γ-aminopropyltrimethoxysilane.

Preferably the alkoxysilane compound is blended in amounts of 0.05 to 5 parts, especially 0.05 to 1 part by weight per 100 parts by weight of the rubber component. Less than 0.05 part by weight of the alkoxysilane compound would fail to provide sufficient adhesive forces whereas more than 5 parts by weight of the alkoxysilane compound would add to the material cost and adversely affect milling operation in rubber mills.

The alkoxysilane compound of formula (1) may be blended in the rubber component by a conventional procedure of addition and mixing. In another procedure, the alkoxysilane compound is once mixed with silica and then mixed with the rubber component for more efficient operation.

Although the rubber composition may consist of the rubber component and the alkoxysilane compound, it may further contain additives if desired. Such additives include reinforcing fillers such as carbon black, silica, clay, and silicic acid, fillers such as calcium carbonate and mica, vulcanizing agents such as sulfur, peroxides and zinc oxide, vulcanization promoters, vulcanization aids, antioxidants, and plasticizers. These optional additives are added in conventional amounts insofar as the advantages of the invention are not lost.

The resin, on the other hand, may be any desired one. A choice may be made among polyethylene, polypropylene, polyvinyl chloride, polystyrene, ABS resins, ethylene-vinyl acetate copolymer resins, acrylic resins, vinylidene chloride resins, polyurethane resins, unsaturated polyester resins, epoxy resins, phenol resins, polycarbonate, polyamide resins, polyimide resins, polyphenylene oxide, polyethylene terephthalate, polybutylene terephthalate, and ionomer resins. Blends and modified products of these resins are also acceptable. Polyamide resins and blends of a polyamide resin with another resin are especially preferred.

Especially in the application of refrigerant carrying hoses, a resin composition comprising 50 to 70% by weight of nylon 6, 15 to 40% by weight of nylon 12, and 5 to 20% by weight of a polyolefin is preferred. If the resin composition contains less than 50% of nylon 6 or more than 40% of nylon 12, more Freon would permeate through a layer of the resin composition and it is necessary to repeatedly make up the refrigerant in order to supplement for a loss of refrigerating capacity. If the resin composition contains more than 20% of polyolefin, the resin would be low in elongation after dry heat aging so that the resin layer might crack when the hose is angularly bent. If the resin composition contains less than 15% of nylon 12, the resin would be low in elongation after hot water aging so that the resin layer might crack when hygroscopic lubricant is used in the hose. If the resin composition contains more than 70% of nylon 6 or less than 5% of polyolefin, the resin would be less flexible and the hose be less durable. It is noted that the polyolefin used herein may be a modified polyolefin such as an ionomer and α-olefin copolymer. The resin composition may contain additives such as heat resistance enhancer and anti-oxidant if desired.

More preferably the resin layer is formed of the above-formulated resin composition having an island-in-sea structure wherein the nylon 6 is a sea phase and the nylon 12 is an island phase and more than 90% of the polyolefin is discretely dispersed in the island phase of nylon 12.

In joining the rubber and the resin together, the resin is preferably surface modified.

For the surface modification of the resin, plasma discharge treatment, corona discharge treatment or ultraviolet radiation irradiation is preferred. Where an inner resin layer 1 of the above-defined resin composition is enclosed with an outer rubber layer (inner tube rubber layer) 2 of the above-defined rubber composition to join the resin layer 1 and the rubber layer 2 to form an inner tube of a refrigerant carrying hose as shown in FIG. 1, it is recommended for enhanced adhesion that the outer surface of the inner resin layer 1 is pretreated by plasma discharge treatment, corona discharge treatment or ultraviolet radiation irradiation before the outer rubber layer 2 is laid thereon. These treatments may be carried out in a conventional manner.

More particularly, the plasma discharge treatment favors a pressure of 1 to 100,000 Pa and an atmosphere gas of argon, helium and nitrogen. The discharge frequency, discharge output and treating time may be properly adjusted in accordance with the geometry and size of the processing apparatus although a frequency of 13.56 MHz, an output of about 10 to 1,000 watts and a time of about 5 sec. to 10 min. are typically used.

The corona discharge treatment is often carried out in air because of ease of operation. It may be carried out in an inert gas such as argon gas or a gas atmosphere of oxygen and nitrogen in order to enhance the treatment effect and hence, adhesion. It is also possible to carry out corona discharge treatment while blowing such gas in proximity to the electrode. In particular, corona discharge treatment in nitrogen gas has advantages of enhanced treatment effect and a relatively low running cost as well as eliminating any countermeasure for ozone which would generate during corona discharge treatment in air. Consequently, the corona discharge treatment in nitrogen gas is most preferred for modifying the resin in the practice of the invention.

Any desired frequency may be used in the corona discharge treatment. Often a frequency of at least 5 kHz, especially 20 to 30 kHz is preferred from the standpoints of treatment effect and efficiency. A frequency of less than 5 kHz would disrupt stable uniform treatment and increase power consumption which results in an increased power cost and renders the electrodes less durable. The discharge output and treatment time may be properly adjusted in accordance with the material, geometry and size of a resin layer to be treated and the geometry and size of electrodes although an output of about 50 to 5,000 watts and a time of about 1 to 60 sec. are typically used.

The treatment by irradiating ultraviolet radiation uses a light source such as mercury lamps, halogen lamps, excimer lamps and excimer laser. Treatment may be done in air or nitrogen gas. The light source output and irradiation time are not critical and may be properly determined in accordance with the type and characteristics of the light source, treating atmosphere, a distance to a resin layer to be treated, and the geometry and size of a resin layer to be treated.

In the practice of the invention, a layer of the unvulcanized rubber composition is laid on a layer of the resin with or without an intervening adhesive, and the layers are subject to vulcanization by a heat press or the like, thereby providing a resin/rubber laminate. The vulcanizing conditions include a temperature of 130° to 190° C. and a time of about 5 minutes to 5 hours though not critical.

The resin/rubber laminate of the invention wherein resin and rubber are firmly bonded together with or without intervening adhesive can be prepared by a simple process in high yields without raising a problem to the working environment. It will find use in a variety of applications, for example, as laminate hoses, vibration dampers and pneumatic springs. The resin/rubber laminate is especially useful as a refrigerant carrying hose.

Referring to FIG. 1, there is illustrated a typical structure of the refrigerant carrying hose. The hose 6 includes an inner tube 3 consisting essentially of an inner resin layer 1 and an outer rubber layer 2 surrounding the resin layer. The inner tube 3 is enclosed with an intermediate layer 4 of reinforcing braid and rubber, which is in turn, enclosed with a rubber cover 5. In the refrigerant carrying hose including the inner tube 3 constructed from the inner resin layer 1 and the outer rubber layer 2, the outer rubber layer is preferably formed of a rubber composition comprising a brominated IB-PMS copolymer and an alkoxysilane compound of formula (1).

As described above, the inner resin layer is adhered to the outer rubber layer without an intervening adhesive, especially when the above-described surface treatment is conducted, whereby the hoses can be efficiently manufactured without raising a disposal of used liquid problem. Alternatively, the inner resin layer is adhered to the outer layer by using an intervening adhesive when the surface treatment is omitted or even when the surface treatment is conducted in order to exert an excellent adhesiveness.

Examples of the adhesive include chlorinated rubber type adhesives, hydrochlorinated rubber type adhesives, phenolic resin type adhesives, isocyanate type adhesives, and other conventional adhesives for use in bonding a rubber with a resin.

The remaining components of the refrigerant carrying hose are not critical and may be conventional. For example, in the refrigerant carrying hose 6 shown in FIG. 1, the reinforcing braid may be made of filaments of vinylon, polyester, nylon, and aramide which are knitted in a spiral or braid fashion. The rubber of the intermediate layer 4 may be butyl rubber. The rubber cover 5 may be formed of EPDM, CR, H—NBR (hydrogenated NBR), Cl-IIR (chlorinated butyl rubber) or the like.

In one preferred embodiment of the refrigerant carrying hose, the inner resin layer 1 has a sufficient thickness of about 0.05 to 0.3 mm to provide a compromise between Freon impermeability and flexibility; the outer rubber layer 2 has a sufficient thickness of about 1 to 4 mm to provide a compromise between water impermeability and flexibility; the intermediate braided rubber layer 4 has a thickness of about 1.4 to 2.6 mm; and the rubber cover 5 has a thickness of about 1 to 2 mm.

The refrigerant carrying hose is prepared, for example, by extruding a resin composition into a tubular form, preferably treating the outer surface of the tubular resin, applying an adhesive if required, extruding a rubber composition around the tubular resin, forming an intermediate rubber layer along with reinforcing braid, and forming a rubber cover, and configuring the resulting layered structure into a hose shape, followed by vulcanization at about 140° to 190° C. for about 15 to 120 minutes.

The refrigerant carrying hose having an inner tube wherein an inner resin layer and an outer rubber layer are firmly joined together is well resistant to thermal softening, heat, and compression set, and prevents refrigerant leakage. The refrigerant carrying hose of the invention is thus quite useful for piping in automobile air conditioners.

EXAMPLE

Examples of the invention are given below by way of illustration and not by way of limitation.

Example 1

Two types of resins, 6-66 copolymer nylon and 12 nylon (5033 and 3035, both commercially available from Ube Kosan K.K.) were extruded through a T die to form films of 150 μm thick.

The films were surface modified by plasma treatment, corona treatment or ultraviolet radiation exposure as shown in Table 1.

Plasma Treatment

A vacuum chamber of glass equipped with parallel plate external electrodes of 10×25 cm spaced 15 cm was connected to a high-frequency power supply through a matching box (SKN-05P and MB-500, both commercially available from Nihon Koshuha K.K.). Plasma treatment was done in an argon gas atmosphere under a pressure of 0.7 Torr at a frequency of 13.56 MHz and an output of 100 W for 3 minutes.

Corona Treatment (1)

Corona treatment electrodes consisting of an electrode of 100 mm×4 mm surface coated with polytetrafluoroethylene of 1 mm thick and an earth electrode of 150×150 mm spaced 5 mm from the coated electrode were connected across a corona power supply (HV05-2 commercially available from TANTEC). A corona discharge was generated in air at an output of 80 W. A nylon film was passed through the corona discharge at a speed of 1 m/min.

Corona Treatment (2)

The corona treatment electrodes used above were entirely disposed in a vessel with a volume of 180×180×900 mm and having a gas inlet and film inlet and outlet ports of 100×0.5 mm. Nitrogen gas was passed into the vessel through the gas inlet at a rate of 1 liter/min. for 5 minutes to purge the air in the vessel with nitrogen gas. Thereafter, a nylon film was treated under the same conditions as in Corona Treatment (1).

Ultraviolet Radiation Exposure

Using a dielectric barrier type excimer UV lamp (model VES20-172 commercially available from Ushio Electric K.K.), a nylon film spaced 5 mm from a window of the lamp was exposed to UV in air for 5 minutes.

Adhesive Application

A commercially available vulcanizing adhesive (Chemlok 220 manufactured by LORD Co., Ltd.) was brush coated onto a nylon film to a dry thickness of about 40 μm.

Control

Nylon films having subject to no surface modification were control samples.

TABLE 1

| Modification | 6-66 nylon | 12 nylon |
| --- | --- | --- |
| Plasma treatment | (a) | (g) |
| Corona treatment (1) | (b) | (h) |
| Corona treatment (2) | (c) | (i) |
| UV exposure | (d) | (j) |
| Adhesive application | (e) | (k) |
| No modification | (f) | (l) |

Separately, eight unvulcanized rubber compositions as shown in Table 2 were prepared and sheeted into sheets of 3 mm thick.

TABLE 2

| Ingredients (pbw) | Rubber composition | | | | | | | |
| --- | --- | --- | --- | --- | --- | --- | --- | --- |
| | (m) | (n) | (o) | (p) | (q) | (r) | (s) | (t) |
| Bromo XP-50 | 100 | 100 | 100 | 100 | - | - | - | - |
| NBR N230S | - | - | - | - | 100 | 100 | 100 | 100 |
| FET carbon | 50 | 50 | 50 | 50 | 40 | 40 | 40 | 40 |
| Stearic acid | 2 | 2 | 2 | 2 | 1 | 1 | 1 | 1 |
| Zinc white | 0.5 | 0.5 | 0.5 | 0.5 | 5 | 5 | 5 | 5 |
| Promoter TT | 0.1 | 0.1 | 0.1 | 0.1 | - | - | - | - |
| Sulfur | - | - | - | - | 1.5 | 1.5 | 1.5 | 1.5 |
| Promoter MBTS | - | - | - | - | 1 | 1 | 1 | 1 |
| Silane (1) | - | 0.5 | - | - | - | 0.5 | - | - |
| Silane (2) | - | - | 0.5 | - | - | - | 0.5 | - |
| Silane (3) | - | - | - | 0.5 | - | - | - | 0.5 |

Note:
Bromo XP-50: isobutylene-p-methylstyrene copolymer rubber with p-methylstyrene partially brominated (Exxon)
NBR N230S: mid/high acrylonitrile-butadiene rubber (Nihon Synthetic Rubber K.K.)
Promoter TT: a vulcanization promoter (Noxeller TT, Ouchi Sinko Kagaku K.K.)
Promoter MBTS: dibenzothiazyl disulfide
Silane (1): γ-(2-aminoethyl)-aminopropyltrimethoxysilane (Toray-Dow coming Silicone K.K.)
Silane (2): γ-aminopropyltriethoxysilane (Toshiba Silicone K.K.)
Silane (3): γ-glycidoxypropyltrimethoxysilane (Toshiba Silicone K.K.)

A rubber sheet was laid on a nylon film in a combination as shown in Table 3 such that the modified surface of the nylon film faced the rubber sheet. Vulcanization was effected by means of a heat press at a pressure of 5 kgf/cm² and a temperature of 140° C. for 80 minutes, obtaining resin/rubber laminates.

Each of the vulcanized resin (nylon)/rubber laminates was cut into a strip of 12 mm wide which was tested by a T-stripping method at a pulling rate of 50 mm/min. using an Autograph manufactured by Shimazu Mfg. K.K. to measure the bonding force between nylon and rubber. The results are shown in Table 3.

TABLE 3

| | Bonding force (kgf/12 mm) | | | | | | | |
| --- | --- | --- | --- | --- | --- | --- | --- | --- |
| | Rubber composition | | | | | | | |
| Resin | (m) | (n) | (o) | (p) | (q) | (r) | (s) | (t) |
| (a) | 1.5 | 6.0 | 6.1 | 4.2 | 1.1 | 4.8 | 4.6 | 4.0 |
| (b) | 0.8 | 0.9 | 5.8 | 0.8 | 0.4 | 4.1 | 4.0 | 3.9 |
| (c) | 1.2 | 5.9 | 6.0 | 4.3 | 1.2 | 5.0 | 4.8 | 4.6 |
| (d) | 2.6 | 4.2 | 5.0 | 4.8 | 1.6 | 4.8 | 3.9 | 4.1 |
| (e) | 0.2 | 3.9 | 4.2 | 4.1 | 4.0 | 4.3 | 4.1 | 4.2 |
| comparison (f) | 0.3 | 0.5 | 0..5 | 0.4 | 0.2 | 0.2 | 0.2 | 0.2 |
| (g) | 1.5 | 4.8 | 5.0 | 4.6 | 1.0 | 4.4 | 4.0 | 3.7 |
| (h) | 0.6 | 0.6 | 4.9 | 0.9 | 0.5 | 3.0 | 2.9 | 2.8 |
| (i) | 1.3 | 4.9 | 4.6 | 4.9 | 1.0 | 3.7 | 3.6 | 3.6 |
| (j) | 2.1 | 3.9 | 4.3 | 4.6 | 1.9 | 2.5 | 2.6 | 2.6 |
| (k) | 0.3 | 4.3 | 4.4 | 4.0 | 3.9 | 4.1 | 4.4 | 4.2 |
| comparison (l) | 0.2 | 0.4 | 0.4 | 0.5 | 0.1 | 0.2 | 0.2 | 0.2 |

As seen from Table 3, the resin/rubber laminates falling within the scope of the invention are improved in adhesion.

Example 2

Figure 2:
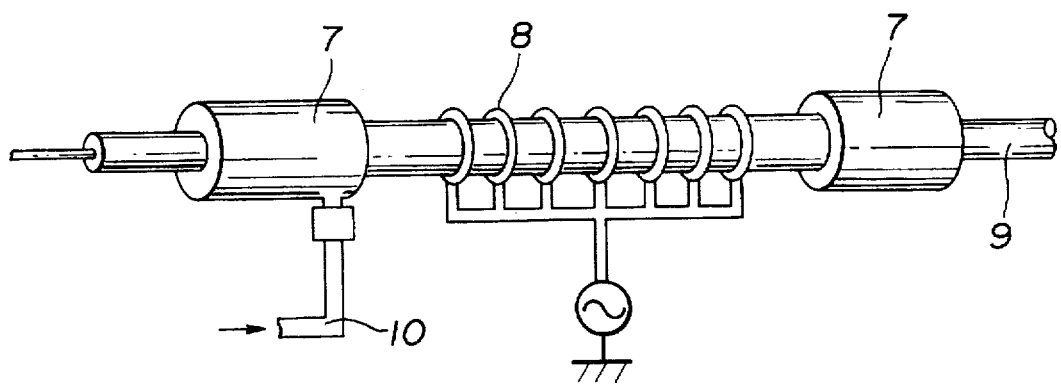
FIG. 2 is a perspective view showing a corona discharge treatment system used in Example.
Figure 3:
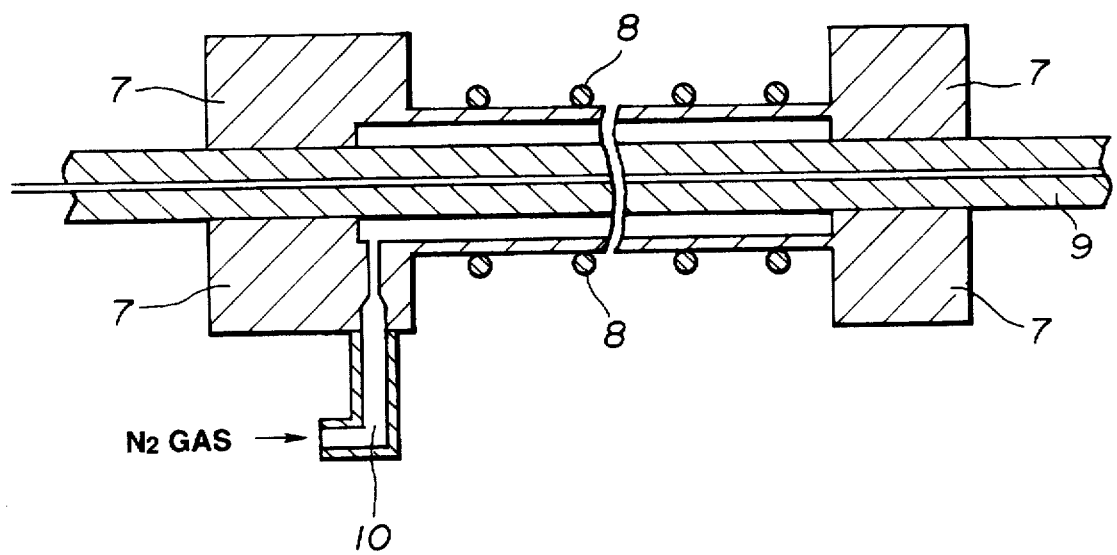
FIG. 3 is a cross-sectional view of the system of FIG. 2.

A refrigerant carrying hose of the structure shown in FIG. 1 was prepared by first extruding a composition consisting of 60% by weight of nylon 6, 30% by weight of nylon 12 and 10% by weight of a polyolefin into a tube having an inner diameter of 11.0 mm and a thickness of 100 μm. Using a corona discharge system as shown in FIGS. 2 and 3, the nylon tube was treated by generating a corona discharge in a nitrogen gas atmosphere at 25 kHz and 300 W and feeding the tube at a speed of 5 m/min. to obtain tube (I). The corona discharge system includes an insulator housing 7 of Teflon® (PTFE) defining a generally cylindrical chamber, an electrode 8 of stainless steel disposed around the chamber and connected to a power supply, a mandrel 9 over which the resin tube is fitted and which passes through the chamber, and an inlet tube 10 for introducing nitrogen gas into the chamber. The mandrel 9 is aligned with the electrode rings 8 and a high concentration of nitrogen is maintained in the discharge zone.

Next, rubber composition (n) of Table 2 was extruded around the corona treated nylon tube (I) to form an outer rubber layer of 1.5 mm thick, obtaining an inner tube.

On the inner tube, a reinforcing filament of polyester was braided and a rubber composition as shown in Table 4 was applied to form an intermediate layer. Further thereon, a rubber composition as shown in Table 5 was extruded to form a rubber cover having a thickness of 1.2 mm and an outer diameter of 18.5 mm. The layered structure was configured to a hose shape and vulcanized at 150° C. for 45 minutes, obtaining a hose A.

TABLE 4

| Intermediate rubber | |
| --- | --- |
| Component | Parts by weight |
| IIR | 85 |
| EPDM | 15 |
| FEF carbon | 70 |
| SRF carbon | 30 |
| Aroma oil | 20 |

TABLE 4-continued

Intermediate rubber

| Component | Parts by weight |
| --- | --- |
| Zinc white | 5 |
| Promoter DM | 0.5 |
| Promoter TT | 1.0 |
| Vulnok R | 1.0 |
| Sulfur | 1.0 |

TABLE 5

Rubber cover

| Component | Parts by weight |
| --- | --- |
| EPDM | 100 |
| FEF carbon | 130 |
| Naphthene oil | 50 |
| Aroma oil | 50 |
| Zinc white | 5 |
| Stearic acid | 5 |
| Promoter M | 1.2 |
| Promoter TT | 1.5 |
| Promoter TS | 1.8 |
| Vulnok R | 1.2 |
| Sulfur | 1.0 |

To the surface of the above corona treated tube (I) was applied an adhesive (Chemlok 220 manufactured by LORD Co., Ltd.) and dried. Next, rubber composition (n) of Table 2 was extruded around the adhesive applied tube (II) to form an outer rubber layer of 1.5 mm thick, obtaining an inner tube. Thereafter, a hose B was prepared in the same manner as in the hose A.

For comparison purposes, a hose C was manufactured as in hose B except that rubber composition (m) of Table 2 was used.

Hoses A, B and C were cut to examine the adhesion between the resin and rubber layers of the inner tube. The bonding force between the resin and rubber layers of the inner tube was measured by a 180° peeling test and the failure state was examined. It was found that hoses A and B had a firm bond, but hose C had a weak bond. The hoses within the scope of the invention is increased in adhesion between the inner resin and outer rubber layers of the inner tube.

Japanese Patent Applications Nos. 230264/1994 and 230265/1994 are incorporated herein by reference.

Although some preferred embodiments have been described, many modifications and variations may be made thereto in the light of the above teachings. It is therefore to be understood that within the scope of the appended claims, the invention may be practiced otherwise than as specifically described.

We claim:

1. A resin rubber laminate comprising:

(i) a layer of a rubber composition blend comprising (a) a rubber component and (b) an alkoxysilane compound of the general formula (1):

wherein $R^1$ and $R^2$ are functional groups, $R^3$ and $R^4$ are hydrocarbon groups, said composition blend comprising 100 parts by weight of rubber component (a) to 0.05 to 5 parts by weight of alkoxysilane compound (b) joined to:

(ii) a surface-modified layer of a resin:

wherein said surface-modified resin layer is surface modified by plasma treatment, corona discharge treatment or exposure to ultraviolet radiation.

2. The resin/rubber laminate of claim 1 wherein the alkoxysilane compound contains an amino group.

3. The resin/rubber laminate of claim 1 wherein said resin comprises a polyamide resin as a main component.

4. The resin/rubber laminate of claim 1 wherein said rubber component is a copolymer of isobutylene and para-methylstyrene, the para-methylstyrene being partially brominated.

5. The resin/rubber laminate of claim 4 which forms a hose for carrying refrigerant.

6. The resin/rubber laminate of claim 5 wherein said resin and said rubber composition form radially inside and outside layers of the hose, respectively.

* * * * *